Dec. 6, 1960  E. T. CARLSON ET AL  2,963,537
BUSWAY
Filed Jan. 5, 1959  2 Sheets-Sheet 1
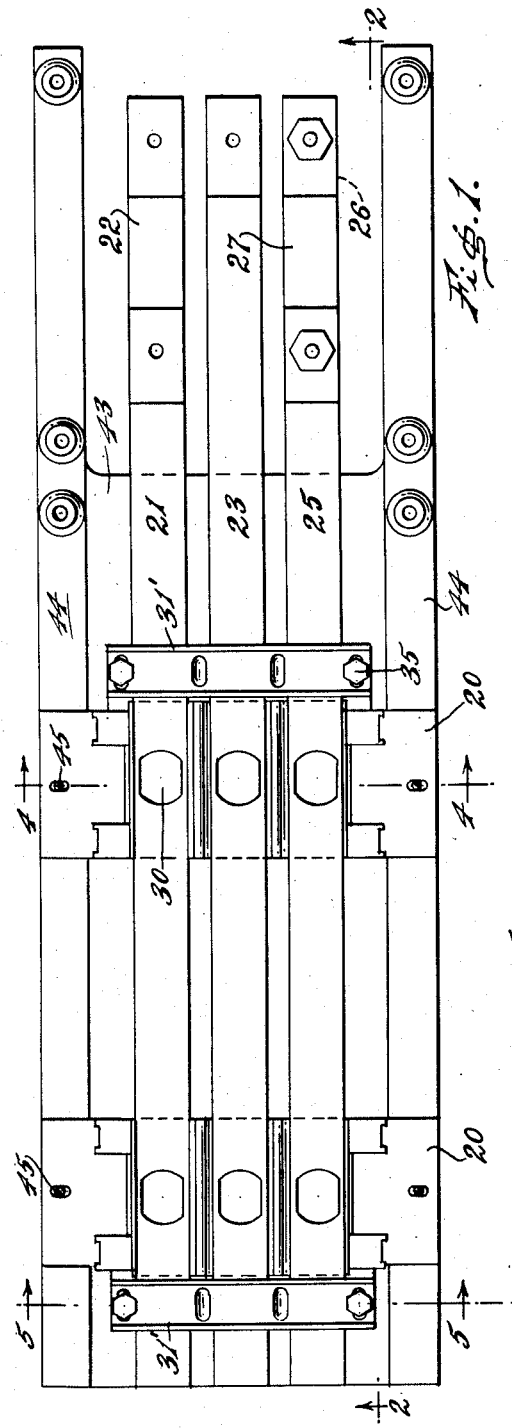
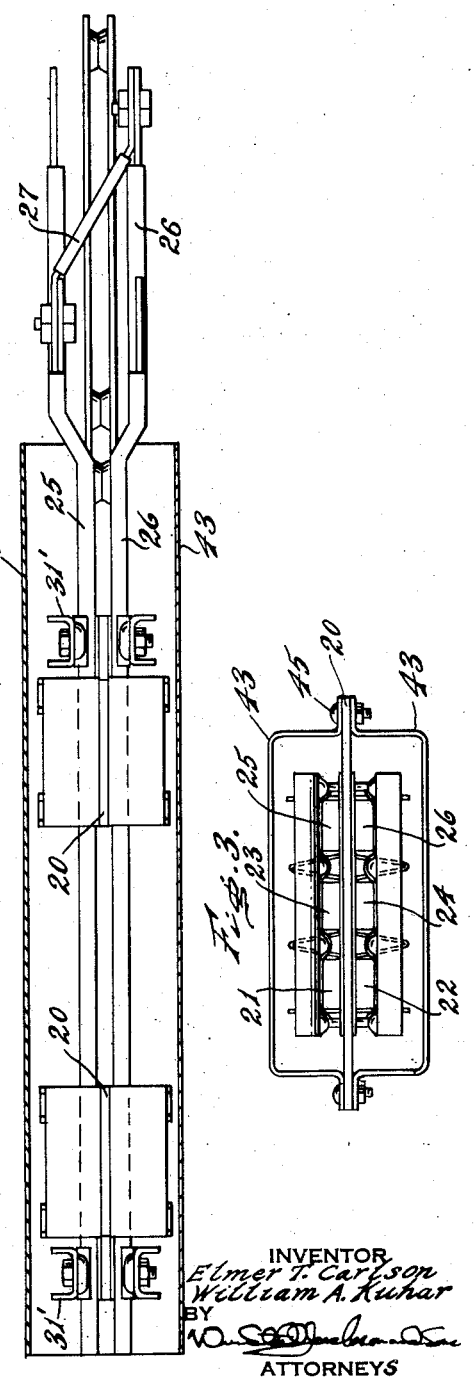
INVENTOR
Elmer T. Carlson
William A. Kuhar
BY
ATTORNEYS Dec. 6, 1960  E. T. CARLSON ET AL  2,963,537
BUSWAY
Filed Jan. 5, 1959  2 Sheets-Sheet 2
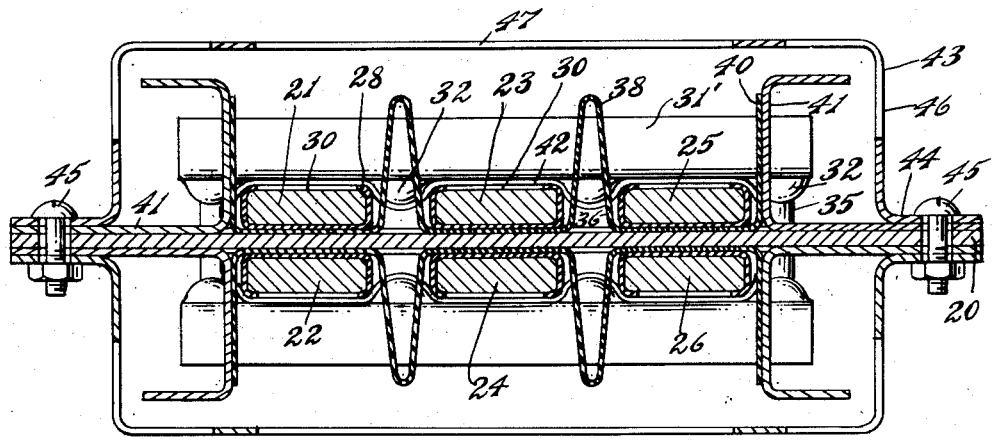
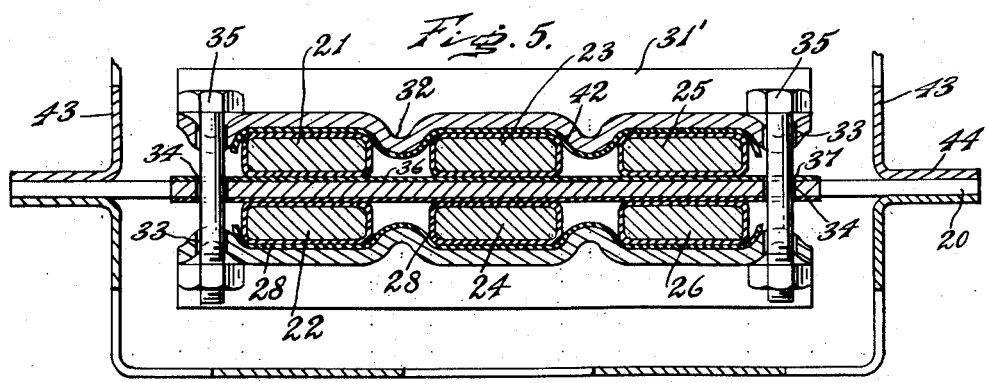
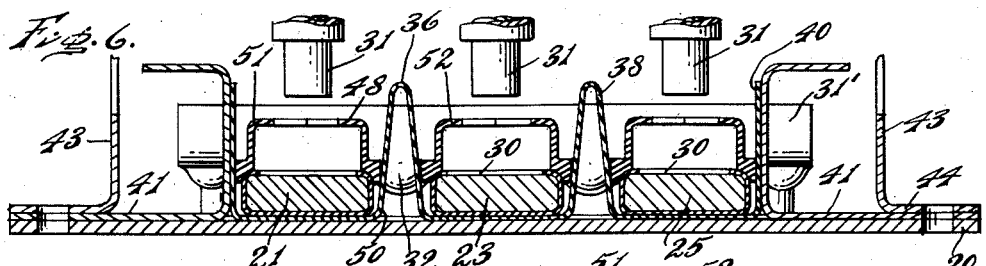
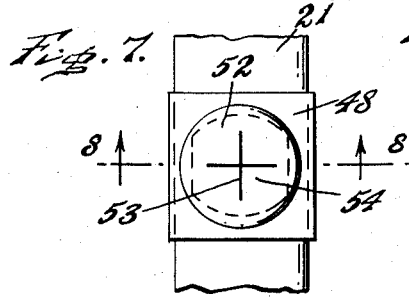
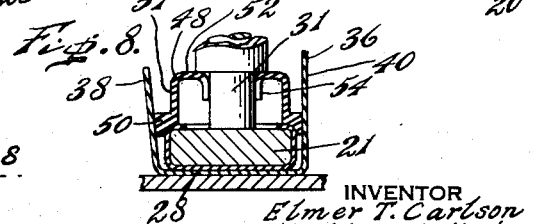
INVENTOR
Elmer T. Carlson
William A. Kuhar
BY
ATTORNEYS United States Patent Office 2,963,537
Patented Dec. 6, 1960

2,963,537

BUSWAY

Elmer T. Carlson, Center Valley, and William A. Kuhar, North Catasauqua, Pa., assignors to Electric Distribution Products, Inc., Allentown, Pa., a corporation of Delaware Filed Jan. 5, 1959, Ser. No. 784,904

5 Claims. (Cl. 174—99)

The present invention relates to busways of the character utilized in electric power distribution in industrial plants, housing units and the like.

A purpose of the invention is to produce a busway of greater inherent short circuit current strength.

A further purpose is to produce a busway which is less fragile and less subject to damage from impact incident for example to dropping of a busway section, or accident such as explosion.

A further purpose is to provide a better phase barrier between bus bars in a busway.

A further purpose is to separate bus bars by metallic supporting plates which are grounded to the busway housing, and to insulate the bus bars from the supporting plates by sheet electrical insulation, and then clamp the bus bars against the metallic supporting plates by metallic clamps which are insulated from the bus bars.

A further purpose is to arrange the bus bars in pairs on opposite sides of the metallic supporting plates and to hold the bus bars in position by clamps.

A further purpose is to provide projections from the clamps between the pairs of bus bars.

A further purpose is to utilize extensions on the electrical insulation protruding between the pairs of bus bars.

A further purpose is to protect the contacting areas of bus bars by elastomer covers provided with openings through which contacts can enter, said openings being normally closed by elastomer flaps.

A further purpose is to position elastomer covers over contacting areas of bus bars by phase separating extensions over the electrical insulation.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

Figure 1 is a top elevation of a bus duct according to the invention with one-half of the housing removed.

Figure 2 is a section on the line 2—2 of Figure 1.

Figure 3 is an end elevation of Figure 1.

Figure 4 is an enlarged section on the line 4—4 of Figure 1.

Figure 5 is a fragmentary enlarged section on the line 5—5 of Figure 1.

Figure 6 is a fragmentary view coresponding to Figure 4 and showing a modification of the bus duct with the associating contacting elements.

Figure 7 is a fragmentary front elevation of Figure 6 omitting the housing.

Figure 8 is a section on the line 8—8 of Figure 7 showing the contacting element in place against the bus bar.

Describing in illustration but not in limitation and referring to the drawings:

In the prior art, busways have been produced in which the bus bars are contained within housings and insulated from the housings by insulating blocks of porcelain, other ceramic or organic plastic such as phenolformaldehyde plastic. It has been very difficult to produce busways of high inherent short circuit strength, and the short circuit strengths of such busways have necessarily been limited.

Furthermore the insulating blocks tend to be fragile and the impact strengths of such prior art busways are limited. Thus the busways are subject to damage during shipment or during assembly as, for example, when sections are dropped, and also are likely to be damaged when struck by moving objects, such as objects propelled by explosions and objects being transported by cranes. Accordingly, such prior art busways have failed through fracture of insulating blocks and electrical and structural breakdown.

It has also been difficult in such prior art constructions to obtain adequate separation of phases at points where contact is being made. There has also been difficulty through lack of proper contact at points on bus bars where connection is made due to accumulation of dust, dirt, grease and the like.

The present invention relates to an improved busway construction in which block insulators have been eliminated and a structure of much greater short circuit strength has been produced.

The construction of the invention is also much more resistant to impact loads and less likely to fail under impact loading.

The invention also produces a much lighter, stronger and simpler construction which is less costly than the products of the prior art.

Very good phase separation is obtained and danger from short circuit is accordingly reduced.

The invention also provides improved protection of contacting areas of bus bars from dirt, dust and grease.

In the device of the invention, steel or other suitable supporting plates 20 extend across the busway and are provided at intervals along the length of the busway lying in the same plane.

The bus bars themselves, suitably consisting of copper or aluminum, are arranged in pairs. The first pair consists of bus bars 21 and 22; the second pair consists of bus bars 23 and 24; and the third pair consists of bus bars 25 and 26. The bus bars of each pair are on opposite sides of the supporting plates 20, the bus bars 21, 23 and 25 thus being in spaced relation on one side of the supporting plates and the bus bars 22, 24 and 26 being in spaced relation on the other side of the supporting plates. The bus bar pairs are arranged side by side, the pair 21, 22 being at one side, the pair 23, 24 being in the middle, and the pair 25, 26 being at the other side.

The bus bars of each pair desirably constitute a phase, so that the pair of bus bars 21 and 22 is connected together at each end; the pair 23 and 24 is connected together at each end and the pair 25 and 26 is connected together at each end. To illustrate this, a single jumper 27 is shown in Figure 2, and similar jumpers are provided on the other bus bar pairs at each end of the busway section.

Each of the bus bars is suitably covered with plastic electrical insulation 28 which desirably extends the full length of the bus bar except where electrical contact is to be made. Thus there are electrical contacting areas 30 which appear particularly in Figure 4 on the outside of each bus bar at a point where electrical contacts 31 for the respective phases will enter the busway as described in Constantine and Carlson U.S. Patents Nos. 2,786,908 and 2,825,775.

At intervals along the busway, metallic clamps 31' extend across on each side of the pairs of bus bars. The clamps desirably have projections 32 from the webs of their channel sections which intrude between each pair of bus bars and also around the outer edge of the outermost pairs of bus bars.

The metallic clamps are suitably formed from sheet steel and they receive and guide the bus bars. The clamps at their outer edges have openings 33 which align with openings 34 in the supporting plates 20, and bolt and nut fastenings 35 are received in the openings and tightened to urge the clamps against the bus bars.

While the clamps are here shown located adjacent contacting areas 30, it will be evident that supporting plates and clamps will be used as desired between contacting areas along the bus bars.

It will of course be evident that other types of fastenings may be used instead of the bolts.

On each side of each supporting plate, and extending over the full length of the supporting plate, there is a piece of sheet electrical insulation 36 which has holes 37 to pass the bolts and at the clamps suitably lies flat along the supporting sheet, but is formed opposite the contacting areas 30 as outward extensions or reverse bends 38 between pairs of bus bars, and also has an outward extension 40 at each side of the bus duct.

The outward extension 40 is desirably supported by a metallic clip 41 disposed along the supporting plate, and extending out from it and permissibly used also to perform other functions, as to support the interlock springs for a protective cover as described in Carlson and Constantine U.S. application Serial No. 558,028, filed January 9, 1956, for Electrical Distribution System.

There is also a sheet of electrical insulation 42 positioned between each clamp and the bus bars and following the contours of the projections 32 on the clamps.

Thus the bus bars are entirely separated from adjoining metallic parts by fiber insulation which is continuous at the critical places, and the fiber insulation also effectively separates the phases where the contacts 31 enter.

Sheet metal, preferably steel, housing halves 43 of channel section are placed around the bus bars and the clamps, provided with outwardly directed flanges 44 which are on opposite sides of the supporting plates 20 and the clips 41, and are secured by bolts 45 through suitable openings.

The housing halves have suitable cooling openings 46 to provide air circulation, and have suitable openings 47 opposite the contacting portions, covered by protective covers, not shown, and receiving plug connectors of plug-in devices.

In the preferred embodiment, as shown in Figures 6, 7 and 8, the contacting areas 30 of the bus bars are covered by elastomer boots 48 suitably of rubber, synthetic rubber such as neoprene, Buna S or Buna N, or elastomer plastic such as polyvinyl chloride. The boots have rims 50 which engage and hug the bus bars and grip between the extensions 38 or 40 of the insulation to seal against dust or dirt and hold the boots in place. The boots then have outwardly protruding tubular bodies 51 and cover portions 52 which are provided with openings or slits 53 in line with the contacts 31 and having elastomeric flaps 54 which resiliently close when the contact portions 31 are withdrawn and open and seal against the contacting portions when the contacting portions 31 advance.

In operation it will be understood that the busway consists of numerous sections in accordance with the present invention, which are connected end to end, adjoining the pairs of appropriate phases. While the particular bus duct is intended for three phase work, it will be understood that it can be used for any other phase desired relationship.

In case of a short circuit, the great short circuit strength of the present device is available. The danger of a short circuit is greatly reduced by the phase barriers provided at 38.

Difficulty with obtaining good contact is largely avoided because of the dust-tight sealing accomplished by the boots.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention, what we claim as new and desire to secure by Letters Patent is:

1. In a busway, a series of supporting plates in the same plane, bus bars arranged in pairs, one bus bar of each pair being on one side of the supporting plates and the other bus bar of each pair being on the other side of the supporting plates, and the pairs being arranged side by side, metallic clamps positioned on opposite sides of the pairs of bus bars, fastenings extending between the clamps, sheet electrical insulation interposed respectively and between the bus bars and the clamps, and between the bus bars and the supporting plates, and housing surrounding the bus bars and secured to the supporting plates.

2. In a busway, a series of supporting plates in the same plane, bus bars arranged in pairs, one bus bar of each pair being on one side of the supporting plates and the other bus bars of each pair being on the other side of the supporting plates, metallic clamps positioned on opposite sides of the pairs of bus bars and having projecting portions extending between the bus bars of each pair, fastenings extending between the clamps, sheet electrical insulation interposed respectively between the bus bars and the clamps and between the bus bars and the supporting plates, and housing surrounding the bus bars and secured to the supporting plates.

3. In a busway, a series of supporting plates in the same plane, bus bars arranged in pairs, one bus bar of each pair being on one side of the supporting plates and the other bus bar of each pair being on the other side of the supporting plates, and the pairs being arranged side by side, metallic clamps positioned on opposite sides of the pairs of bus bars and offset of the bus bars longitudinally along said clamps with respect to certain portions of the supporting plates, fastenings extending between the clamps, sheet electrical insulation interposed respectively between the bus bars and the clamps and between the bus bars and the supporting plates, and housings surrounding the bus bars and secured to the supporting plates.

4. In a busway, a series of supporting plates in the same plane, bus bars arranged in pairs, one bus bar of each pair being on one side of the supporting plates and the other bus bar of each pair being on the other side of the supporting plates, and the pairs being arranged side by side, metallic clamps positioned on opposite sides of the pairs of bus bars, fastenings extending between the clamps, the bus bars having contacting portions at intervals along their length disposed with respect to the clamps, sheet electrical insulation interposed between the bus bars and the clamps and sheet electrical insulation interposed between the bus bars and the supporting plates, and protruding outwardly from the supporting plates between the bus bars of the respective pairs.

5. In a busway, first and second metallic supporting plates generally in the same plane and spaced from one another, housings secured to the supporting plates and extending longitudinally from plate to plate, bus bars arranged in pairs, one bus bar of each pair being on one side of the supporting plates, the bus bars extending through the housing, and the pairs being arranged in side by side relation, there being openings in the housings cooperating with the bus bars at the positions of the supporting plates, metallic clamps on either side of the pairs of bus bars offset longitudinally of the bus bars with respect to the openings in the housings, metallic fasteners extending between the clamps, sheet electrical insulation between the clamps and the bus bars, and sheet electrical insulation between the bus bars and the supporting plates having reverse bend portions extending outwardly between the pairs of bus bars at the locations of the openings in the housings to form phase separating extensions.

References Cited in the file of this patent

UNITED STATES PATENTS

| | | |
|---|---|---|
| 2,287,502 | Togesen et al. | June 23, 1942 |
| 2,310,919 | Adam | Feb. 16, 1943 |
| 2,372,267 | Frank et al. | Mar. 27, 1945 |
| 2,482,310 | Adam | Sept. 20, 1949 |
| 2,619,515 | Doane | Nov. 25, 1952 |